(12) United States Patent
Bauer-Schwan et al.

(10) Patent No.: US 7,187,852 B1
(45) Date of Patent: Mar. 6, 2007

(54) METHOD AND APPARATUS FOR ON-THE-FLY DVD ENCODING

(75) Inventors: Stefan Bauer-Schwan, Baden-Baden (DE); Freddie Geier, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 1092 days.

(21) Appl. No.: 10/000,768

(22) Filed: Oct. 24, 2001

(51) Int. Cl.
*H04N 5/91* (2006.01)
*H04N 5/00* (2006.01)

(52) U.S. Cl. ......................................... 386/98; 386/126
(58) Field of Classification Search ................... 386/1, 386/45, 68–70, 95, 98, 109, 111, 120, 124–126; 348/220
See application file for complete search history.

(56) References Cited

U.S. PATENT DOCUMENTS 6,266,483 B1 * 7/2001 Okada et al. ............... 386/128
6,480,666 B1 * 11/2002 Wilson et al. ................ 386/70

* cited by examiner

*Primary Examiner*—Thai Q. Tran
*Assistant Examiner*—Mishawn Dunn
(74) *Attorney, Agent, or Firm*—Slattler, Johansen & Adeli LLP

(57) ABSTRACT

A method of integrating audio information and video information, with a single pass is disclosed. In the system of the present invention, a first pass is made through a collection of audio and video information to determine certain information that will be needed to create an integrate bitstream. Specifically, a length in time of each video object unit is determined and a size of each video object unit is determined. This information is used to construct a video object unit table that will be used to create video object units. The video object unit table contains navigation information needed to navigate a DVD. The navigation information is generated from length in time of each video object unit and size of each video object unit. Once video object unit table is created, the system proceeds to recording an output file that contains integrated audio information, video information, and navigation information using.

25 Claims, 3 Drawing Sheets

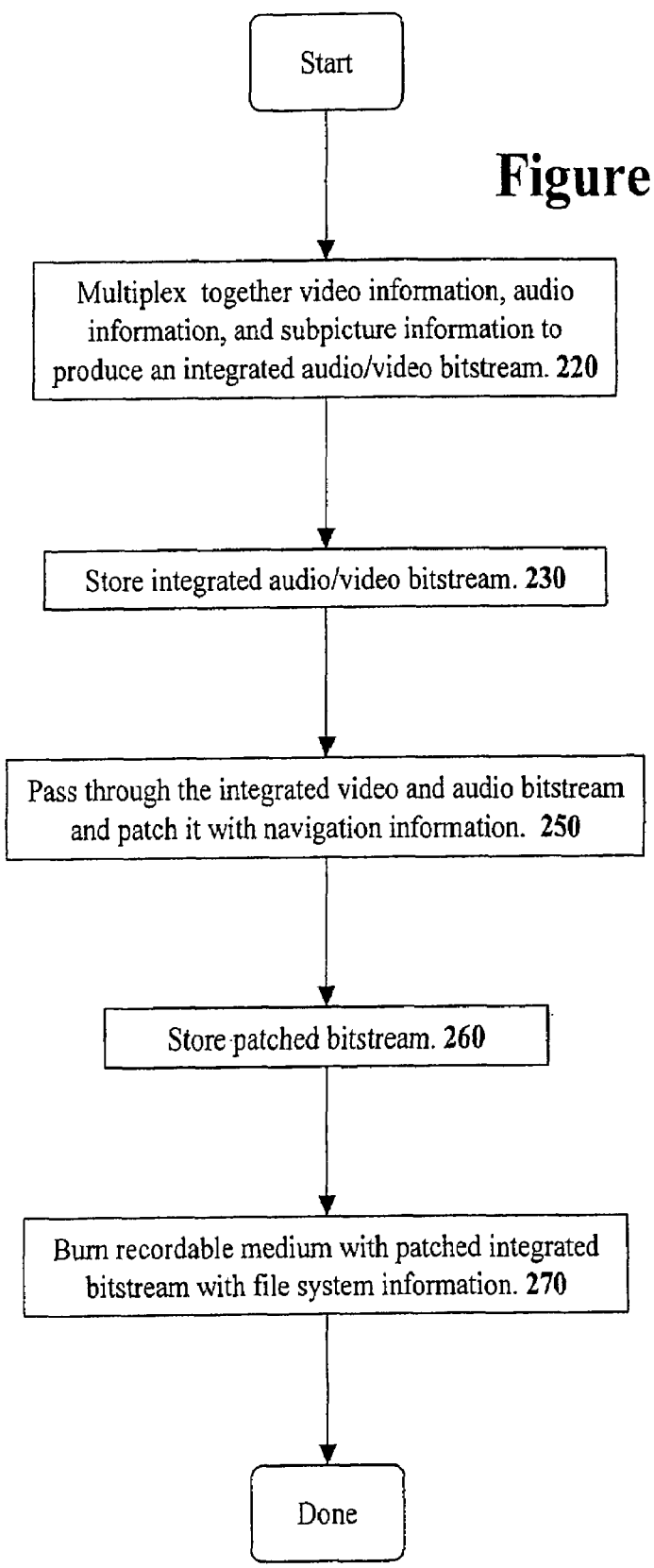
Figure 2 -- Prior Art --

Figure 3

Start

↓

Performa first pass through the video information, audio information, and subpicture information to produce a video object table table that stores the length of each video object unit (in seconds) and the size of each video object unit (in bytes). 320

↓

Use the size of each video object unit to determine a relative location of each video object unit. 330

↓

Use the length of each video object unit and relative location of each video object unit to generate a navigation sector for each video object unit. 350

↓

Generate a recordable output stream by multiplexing together the video, audio, subpicture, navigation, and file information information using information stored in the video object table. 370

↓

Done

METHOD AND APPARATUS FOR ON-THE-FLY DVD ENCODING

FIELD OF THE INVENTION

The present invention relates to the field of digital video and audio encoding. In particular the present invention discloses a single-pass video and audio encoding system.

BACKGROUND OF THE INVENTION

With the advent of very fast computer processors, high-density storage systems, and fast computer networks, digital audio and video is gradually replaces analog audio and video. The United States had begun a transition from an analog video broadcast standard commonly known as NTSC (National Television Standards Committee) to a digital video broadcast standard commonly referred to as ATSC (Advanced Television Systems Committee). Digital video provides many advantages over analog video such as greater bandwidth efficiency, signal robustness, and higher resolution video formats.

The transition from the legacy analog television broadcast format to the newer digital television broadcast format is proceeding slowly. Although the official FCC (Federal Communication Commission) plan is to have television stations begin to turn off analog television broadcast transmitters by 1996, most analysts believe analog television broadcasting will extend beyond that time.

One digital video format that has been rapidly adopted is the Digital Versatile Disc (DVD, sometimes referred to as the Digital Video Disc) format. The DVD format uses an optical disc format that is the same physical form factor as the well-known Compact Disc (CD) format but contains a higher density media. DVD videodiscs store video information using the MPEG2 (Motion Picture Expert Group) video compression standard. DVD players have been one of the fastest growing consumer electronics platforms. In the period beginning with the introduction of the DVD format in 1997 up to mid 2001, there have been over twenty million DVD players sold in the United States. The low cost and high quality of the DVD format has guaranteed its success.

Up until recently, the DVD format has been a "read only" format for consumers. Specifically, consumers could only purchase prerecorded DVD videodiscs. However, DVD recorder systems have recently become available. In order to record a DVD, sophisticated DVD authoring software is required. The DVD authoring software must mix together digital video data, digital audio data, control data, and file format data in order to create an integrated bitstream that will be used to create a DVD videodisc. Creating this integrated bitstream has traditionally been a cumbersome process only performed by video professionals in order to create prerecorded DVD videodiscs. To allow consumers to be able to record their own DVD videodiscs, it would be desirable to simplify and shorten the process of creating an integrated bitstream.

SUMMARY OF THE INVENTION

A method of integrating audio information and video information, with a single pass is disclosed. In the system of the present invention, a first pass is made through a collection of audio and video information to determine certain information that will be needed to create an integrate bitstream. Specifically, a length in time of each video object unit is determined and a size of each video object unit is determined. This information is used to construct a video object unit table that will be used to create video object units. The video object unit table contains navigation information needed to navigate a DVD. The navigation information is generated from length in time of each video object unit and size of each video object unit. Once video object unit table is created, the system proceeds to recording an output file that contains integrated audio information, video information, and navigation information using.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which:

FIG. 2 illustrates a flow diagram describing a traditional method of authoring a DVD videodisc.

FIG. 3 illustrates a flow diagram describing how the present invention generates an integrated bitstream with video, audio, navigation, and subpicture information in a single writing pass.

DETAILED DESCRIPTION OF THE PREFERRED EMBODIMENT

Figure 1:
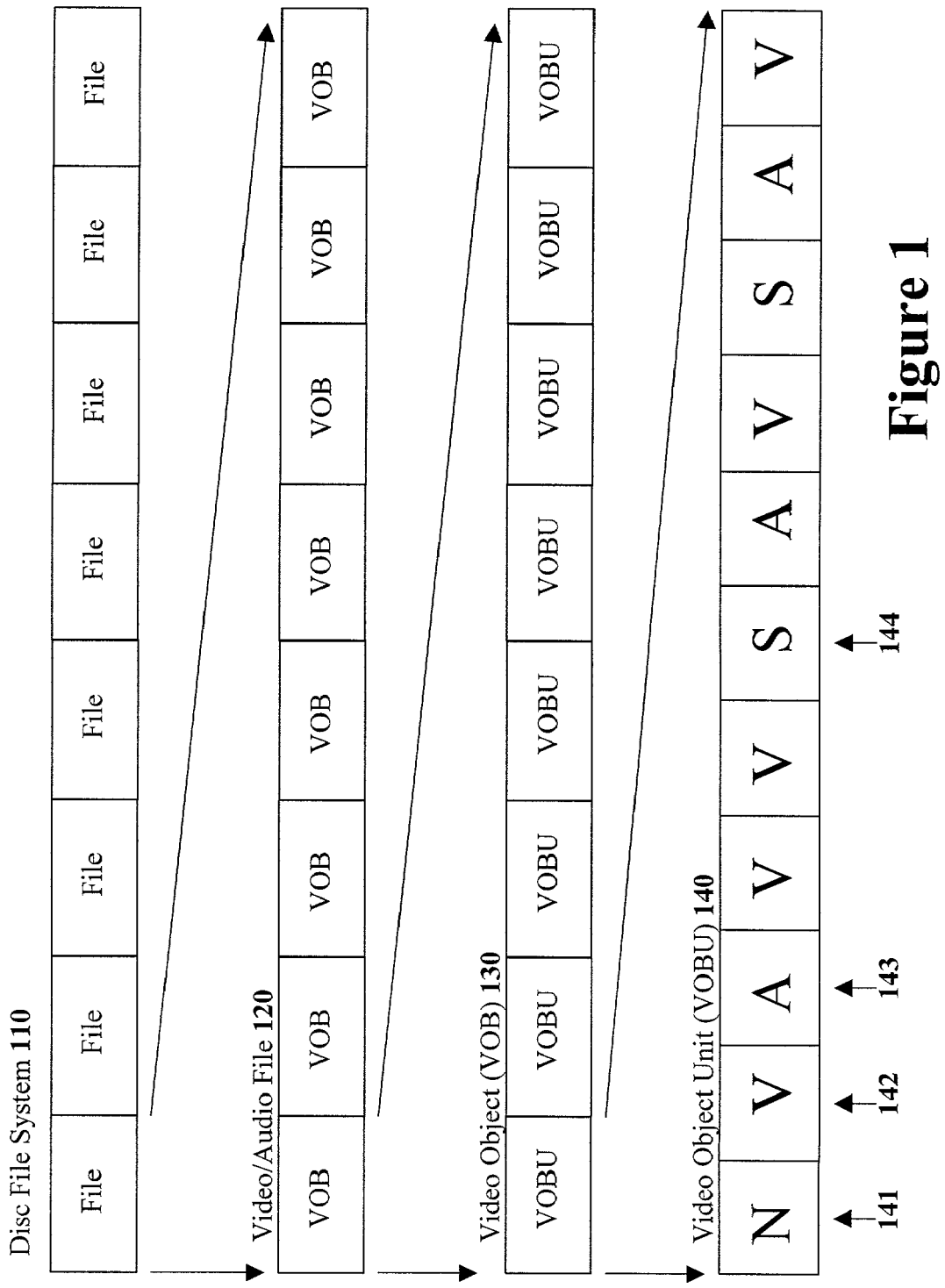
FIG. 1 conceptually illustrates the organization of information on a DVD videodisc.

A method and apparatus for on-the-fly DVD encoding is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to recording onto a DVD optical medium. However, the same techniques can easily be applied to other types of recordable media.

DVD Videodiscs

The Digital Versatile Disc (DVD) media format has become very popular as a prerecorded video format. The DVD format offers both high quality MPEG2 (Motion Picture Expert Group) compressed video and very high quality Dolby Digital or DTS (Digital Theater Systems) digital audio. The DVD format is also very high density such that DVD videodiscs can offer audio commentary tracks, scene outtakes, alternate endings, behind-the-scene documentaries, and other extra features in addition to a main feature presentation. This wealth of extra features can be mapped and randomly accessed with a menu system. Due to all of these advanced features, the DVD has become an exceeding popular video format.

FIG. 1 conceptually illustrates the organization of information on a DVD videodisc. At the highest level is the DVD disc file system 110. The DVD disc file system 110 organizes the information into one or more individual digital files as is common among computer operating systems. There are three different sub-standards for a DVD: DVD-Video, DVD-Audio, and DVD-Video_Recording. All three of these sub-standards are based on the physical (DVD-ROM, DVD-R, DVD-RW, etc.) and logical specifications (mainly UDF and ISO 9660) of DVD.

FIG. 1 illustrates an example digital file 120 that comprises content from the three previously defined sub-standards. A digital file 120 is made up of one or more video objects (VOBs). A video object is a compressed format that stores video and audio information that may be played back. In order to be played in a contiguous manner, all the information for a particular video should be placed into a single digital video/audio file. Thus, if there are three edited video objects (VOBs) that should be played contiguously, all three video objects (VOBs) should be placed into the same file.

FIG. 1 illustrates an example video object (VOB) 130. Each video object (VOB) is comprised of a multiplexed stream of video, audio, control, and subpicture information. The multiplexed stream of video, audio, control, and subpicture information is divided into individual units known as Video Object Units (VOBUs). FIG. 1 illustrates an example Video Object Unit (VOBU) 140.

As illustrated in FIG. 1, Video Object Unit (VOBU) 140 consists of individual sectors of video (V), audio (A), control (N), and subpicture (S) information. Each Video Object Unit (VOBU) always begins with a control sector known as a Navigation (N) sector as illustrated with Navigation (N) sector 141 in example Video Object Unit (VOBU) 140. The Navigation sector contains information that allows a player to navigate forward or backward to other nearby Video Object Units (VOBUs).

The remaining sectors in the Video Object Unit (VOBU) 140 consist of video sectors such as video sector (V) 142 that contain digital video information, audio sectors such as audio sector (A) 143 that contain digital audio information, and subpicture sectors such as subpicture sector (S) 144 that contain subpicture information. The video sectors (V) generally store MPEG1 or MPEG2 compressed video information. The audio sectors (A) may store audio information stored in Pulse Coded Modulation (PCM) form, MPEG audio, Dolby Digital (AKA AC-3), Digital Theater Sound (DTS), Sony Dynamic Digital Sound (SDDS), or other digital audio form. Subpicture sectors generally include information such as video subtitle overlay information and menu information that is Run Length Encoded (RLE). Each Video Object Unit (VOBU) in a Video Object (VOB) contains information for between 0.4 second and 1.0 second of recorded video.

The Navigation sector (N) contains information for navigating around the Video Object (VOB). The Navigation sector (N) includes pointers to other nearby Video Object Units (VOBUs) such that a DVD player can quickly navigate to those nearby Video Object Units (VOBUs) when performing a "fast forward" or "reverse" video function. Generally, a navigation sector contains pointers to the nearby VOBUs that are ½, 1, ³⁄₂, 2, 2½, 5, 10, 30, 60, and 120 seconds away from the current VOBU. Specifically, the information is known as the VOBU_SRI that contains forty-two fields: twenty-one forward references and twenty-one backward references. This information is required for DVD videodiscs to comply with the standard. Relevant detailed information can be found in the "DVD Specification for Read-Only Discs—Part 3 Video Specification"

DVD Authoring

FIG. 2 illustrates the traditional method of generating the information needed to record a DVD. First, at step 220, an authoring system multiplexes together video information, audio information, and subpicture information to produce an integrated audio and video bitstream. Next, at step 230, the integrated video/audio bitstream is stored. In most embodiments, the integrated video/audio bitstream is stored onto a magnetic medium such as a hard disk drive.

At step 250, the authoring software passes through the integrated video/audio bitstream patches the integrated video/audio bitstream with navigation information. Specifically, the authoring software adds the navigation sectors such as navigation sector 141 illustrated in FIG. 1. The patched integrated bitstream is then stored at step 260.

Finally, the authoring software again passes through the patched integrated video/audio bitstream and stores the patched integrated video/audio bitstream onto a recordable medium. While storing the patched integrated video/audio bitstream, the authoring software generates the necessary file system information needed to identify the patched integrated video/audio bitstream as a file on the recordable medium.

The process of DVD authoring set forth in FIG. 2 is long multiple step process. In the process of FIG. 2, several intermediary steps store various different integrated bitstreams. For example, step 230 stores a first integrated audio/video bitstream and then step 260 stores a patched integrated audio video bitstream. The process of creating and storing these various different integrated bitstreams causes the process to be long and resource intensive.

Improved DVD Authoring

The present invention introduces an improved method of authoring integrated audio/video bitstreams that may be recorded onto a recordable DVD medium. In the system of the present invention, the procedure is shortened and simplified by performing a first pass that only generates a table of vital multiplexing information. Once completed, the table of vital multiplexing information will allow an integrated bitstream containing audio, video, subpicture, navigation, and file information to be generated in a single pass.

FIG. 3 illustrates a flow diagram describing how the method of the present invention operates. Referring to FIG. 3, the first step 320 is to make a first pass through the audio, video, and subpicture information to generate a video object unit table with specific needed information. For each video object unit (VOBU), the video object unit table stores a flag that specifies if the VOBU has video at all, the length (in seconds) of the video object unit (VOBU), and the size (in bytes) of the video object unit (VOBU). In one preferred embodiment, the video object unit table contains a full copy of the VOBU_SRI table (as defined in the DVD standard) of the navigation sector of the video object unit (VOBU). The video object unit table will later be used to construct a video object.

Next, at step 330, the system of the present invention uses the size of each video object unit to generate a relative location of each video object unit. In one embodiment, the relative location of the first video object unit is zero bytes, the relative location of the second video object unit is the size of the first video object unit, the relative location of the third video object unit is the size of the first video object unit plus the size of the second video object unit, and so on.

Then at step 350, the system of the present invention uses the length (in time) of each video object unit to generate navigation information needed for each video object unit. Specifically, the information for the initial navigation sector of each video object unit is generated by identifying the needed neighboring video object units and then identifying those neighboring video objects with the relative location values generated in step 330.

Finally, an integrated bitstream can be generated in a single pass through the data in step 370. The integrated bitstream is generated using collected and generated information that is stored in the intermediary table. Specifically, the system of the present invention outputs a fully multiplexed bitstream with audio, video, subpicture, navigation, and file information. For each video object unit (VOBU) that needs to be written, the system first creates the beginning navigation sector using the information from the tables. Then, the audio, video, and subpicture sectors are written. In the embodiment that creates a full copy of the VOBU_SRI table for each video object unit (VOBU), the generation of the navigation sector is relatively trivial since the VOBU_SRI table comprises the majority of the navigation sector.

The foregoing has described a method and apparatus for on-the-fly DVD encoding. It is contemplated that changes and modifications may be made by one of ordinary skill in the art, to the materials and arrangements of elements of the present invention without departing from the scope of the invention.

We claim:

1. A method of integrating audio information and video information, said method comprising:
    performing a first analysis pass through said audio information and said video information to derive information needed to record media with an integrated audio and video stream, performing said first analysis pass comprising
        determining a length in time of each video object unit,
        determining a size of each video object unit, and
        generating a video object unit table, said video object unit table specifying said length in time of each video object unit and said size of each video object unit; and
    in a second formatting pass, recording an output file comprising integrated audio information, video information, and navigation information using said video object unit table.

2. The method of integrating audio information and video information as claimed in claim 1 wherein said video unit object table further specifies video object unit navigation sector information.

3. The method of integrating audio information and video information as claimed in claim 2 wherein said video object unit navigation sector information comprises a VOBU_SRI table.

4. The method of integrating audio information and video information as claimed in claim 1 wherein recording said output file comprises burning a DVD.

5. The method of integrating audio information and video information as claimed in claim 2 wherein said navigation sector information comprises relative locations of nearby video object units.

6. The method of integrating audio information and video information as claimed in claim 1 wherein performing said first analysis pass further comprises
    determining a relative location of each video object unit.

7. The method of integrating audio information and video information as claimed in claim 1 wherein generating a video object unit table comprises generating a navigation sector for each video object unit.

8. A method of integrating audio information and video information, said method comprising:
    performing a first analysis pass through said audio information and said video information to obtain navigation information for navigating through an integrated stream with audio information, video information, and navigation information; and
    performing a second formatting pass to multiplex together said audio information and video information using said navigation information to generate the integrated stream of audio information, video information, and navigation information.

9. The method of integrating audio information and video information as claimed in claim 8, said method further comprising:
    recording an output file comprising said integrated stream of audio information, video information, and navigation information.

10. The method of integrating audio information and video information as claimed in claim 1 wherein said video object unit table comprises a size of each video object unit.

11. The method of integrating audio information and video information as claimed in claim 1 wherein said video object unit table comprises a length in time of each video object unit.

12. The method of integrating audio information and video information as claimed in claim 1 wherein said video object unit table comprises a relative location of each video object unit.

13. The method of integrating audio information and video information as claimed in claim 1, said method further comprising:
    generating a navigation sector for each video object unit using information from said video object unit table.

14. The method of integrating audio information and video information as claimed in claim 13 wherein said navigation sector comprises a VOBU_SRI table.

15. The method of integrating audio information and video information as claimed in claim 8 wherein said integrated stream further comprises subpicture information.

16. The method of integrating audio information and video information as claimed in claim 8 wherein said integrated stream further comprises file information.

17. The method of integrating audio information and video information as claimed in claim 9 wherein recording an output file comprises burning a DVD.

18. The method of integrating audio information and video information as claimed in claim 8, wherein said first analysis pass produces a video object unit table, wherein said second formatting pass uses said video object unit table to multiplex together said audio information and video information using the video object unit table to generate an integrated stream of audio information, video information, and navigation information.

19. A computer readable medium that stores a computer program for integrating audio information and video information, the computer program comprising executable instructions for:
    performing a first analysis pass through said audio information and said video information to obtain navigation information for navigating through an integrated stream with audio information, video information and navigation information; and
    performing a second formatting pass to multiplex together the audio information and the video information using said navigation information to generate the integrated stream of audio information, video information, and navigation information.

20. The computer readable medium as claimed in claim 19, said computer readable medium further storing a set of executable instructions for:

recording an output file comprising said integrated stream of audio information, video information, and navigation information.

21. The computer readable medium as claimed in claim 20, wherein recording an output file comprises burning a DVD.

22. The computer readable medium as claimed in claim 19, wherein said first analysis pass produces a video object unit table, wherein said second formatting pass uses said video object unit table to multiplex together said audio information and video information using the video object unit table to generate an integrated stream of audio information, video information, and navigation information.

23. The computer readable medium as claimed in claim 22, wherein said video object unit table comprises a size of each video object unit.

24. The computer readable medium as claimed in claim 22, wherein said video object unit table comprises a length in time of each video object unit.

25. The computer readable medium as claimed in claim 22, said computer readable medium further storing a set of executable instructions for:

generating a navigation sector for each video object unit using information from said video object unit table.

* * * * *

UNITED STATES PATENT AND TRADEMARK OFFICE
CERTIFICATE OF CORRECTION

PATENT NO. : 7,187,852 B1
APPLICATION NO. : 10/000768
DATED : March 6, 2007
INVENTOR(S) : Stefan Bauer-Schwan et al.

It is certified that error appears in the above-identified patent and that said Letters Patent is hereby corrected as shown below:

<u>Column 6,</u>

Claim 11, lines 17-20 read, "The method of integrating audio information and video information as claimed in claim 1 wherein said video object unit table comprises a length in time of each video object unit."

should read (correction to reference cited) -- The method of integrating audio information and video information as claimed in claim 18 wherein said video object unit table comprises a length in time of each video object unit. --

Claim 12, lines 21-24 read, "The method of integrating audio information and video information as claimed in claim 1 wherein said video object unit table comprises a relative location of each video object unit."

should read (correction to reference cited) -- The method of integrating audio information and video information as claimed in claim 18 wherein said video object unit table comprises a relative location of each video object unit. --

Claim 13, lines 25-27 read, "The method of integrating audio information and video information as claimed in claim 1, said method further comprising:"

should read (correction to reference cited) -- The method of integrating audio information and video information as claimed in claim 18, said method further comprising: --

Signed and Sealed this

Twenty-third Day of October, 2007

JON W. DUDAS
*Director of the United States Patent and Trademark Office*